March 25, 1952     V. H. SCHNEBEL     2,590,656
SAFETY VALVE
Filed Jan. 22, 1949
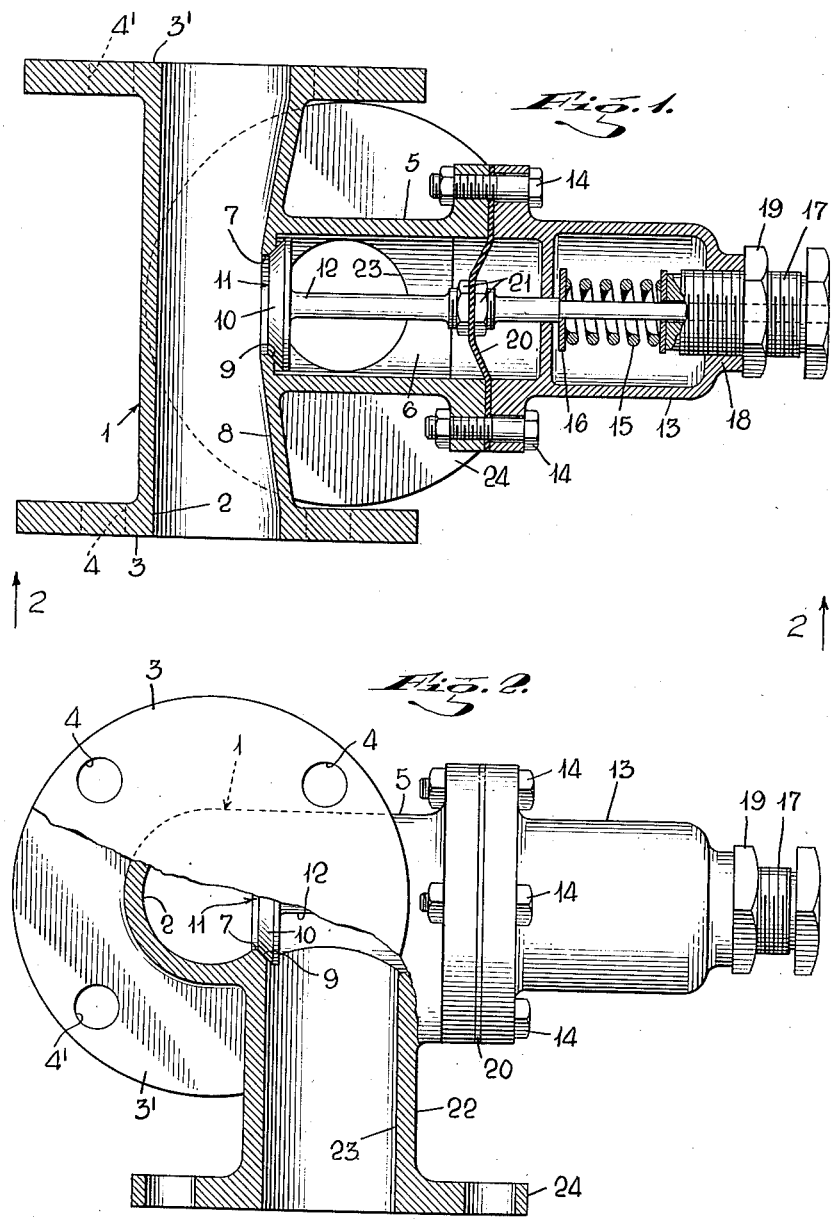
INVENTOR
VERNE H. SCHNEBEL Patented Mar. 25, 1952

UNITED STATES PATENT OFFICE 2,590,656

SAFETY VALVE

Verne H. Schnebel, Clark Township, N. J., assignor to Merck & Co., Inc., Rahway, N. J., a corporation of New Jersey Application January 22, 1949, Serial No. 72,178

7 Claims. (Cl. 137—53)

This invention relates to valve constructions, and particularly to valves of the automatic release type normally referred to as safety valves. More particularly, the invention relates to an improved safety valve which is adapted for use in fluid lines which are intended to carry relatively large amounts of suspended solid matter.

It has normally been the practice in providing automatic release valves or safety valves in fluid lines to mount such valves in T couplings, spur lines or other chambers off-set from the direct path of flow of fluid. In pipes, conduits or other feed lines for the moving of fluids containing substantial quantities of suspended solid matter, the use of the normal safety valves mounted in the conventional way as above-mentioned has in many instances led to difficulty due to the failure of the safety valve. It has been found that in such instances the failure of the safety valve can generally be attributed to an accumulation of solid matter, from the fluid being transported, in the off-set chamber in which the valve is mounted. Frequently the accumulated solid matter fills up to a point of entirely closing off the off-set chamber so that it is wholly impossible for the valve to respond to excess pressure of fluid in the line. In some instances also the physical accumulation of solid matter is augmented by the chemical composition of the fluid being transported with the result that the accumulated particles may become cemented or bonded together as they accumulate in the vicinity of a safety valve. The relative lack of motion of fluid adjacent to a safety valve when mounted in an off-set chamber as above-mentioned increases the tendency for accumulation of deposit in the off-set chamber due to chemical reaction, even in instances where the amount of solid matter in the fluid stream is not excessive.

An object of my invention is to overcome the difficulty above-mentioned in the normal use of safety valves by providing a new safety valve unit for direct mounting in a pipe, conduit or other fluid feed line, a further object being to provide a safety valve unit of the class described wherein the valve face is arranged to be substantialy flush with the inner surface of said unit and in direct contact with fluid passing therethrough, a still further object being to provide a safety valve unit having a fluid passage therethrough registering with a valve substantialy flush with inner surfaces of said passage and having a constricted inner surface contour to provide an accelerated flow of fluid adjacent said valve.

These and other objects of my invention will be better understood from a consideration of the following description and accompanying drawing in which the various parts of the device are identified by suitable reference characters in each of the views, and in which Figure 1 is a sectional view of my improved valve unit taken on a plane defined by the valve axis and the axis of the fluid passage therethrough, and Figure 2 is a view in the direction of the arrows 2—2 in Fig. 1 with part of the construction broken away and in section.

My improved valve unit comprises a main body 1 having an elongated fluid passage 2 extending therethrough, and having at opposite ends of said passage suitable means as indicated by the flanges 3, 3' for mounting the valve unit in a pipe, conduit or other fluid feed line. The flanges 3, 3' are indicated as having circumferentially spaced apertures 4, 4' to receive suitable bolts, or other coupling devices. It should be understood, however, that any conventional means may be employed for coupling the valve unit with adjacent members of a fluid feed line.

The body 1 is provided centrally of one side thereof with a tubular off-set 5 forming a passage or valve chamber 6 registering with the passage 2 through a valve aperture 7. Walls 8 of the passage 2 are inwardly tapered adjacent the aperture 7, so that the periphery of the aperture 7 lies in a common plane.

The periphery of the aperture 7 within the passage 6 is beveled to form a valve seat 9 for engagement with a movable valve 10. The valve 10 and valve seat 9 are so fashioned that the face 11 of the valve is substantially flush with inner surfaces of the passage 2.

The valve 10 is provided with an elongated valve stem 12 extending beyond the end of the tubular off-set 5 for engagement with a yieldable valve supporting unit 13 which is detachably coupled by suitable means, as indicated by the bolts 14, to the end of said tubular off-set. The valve supporting unit may be of any conventional type having means, as indicated by the spring 15, engaging a collar 16 on the valve stem 12 yieldably urging the valve into engagement with the valve seat 9. It is also preferable to employ in the valve supporting unit adjustable means, as indicated by the sleeve 17, in threaded engagement with the end 18 of the supporting unit, and lock-nut 19 for varying the tension of the spring 15 in adjusting the valve to open under predetermined fluid pressures.

Disposed between the tubular off-set 5 and the valve supporting unit 13 is a flexible diaphragm 20 which is adjustably coupled, as indicated by the lock-nuts 21, to the valve stem 12 for preventing fluid from passing through the end of the tubular off-set 5.

The tubular off-set 5 is provided at one side thereof with a tubular discharge 22 having a fluid passage 23 registering with the valve chamber 6 and having at the free end thereof means, as indicated by the apertured flange 24, for coupling the same to a discharge or waste line. The tubular discharge 22 is arranged substantially at right angles to the plane defined by the axis of the valve stem 12 and the axis of the fluid passage 2, and in mounting my improved valve unit in a pipe, conduit or other fluid feed line, the unit is preferably oriented as shown in Figure 2 of the drawing, i. e. with the passage 2 in a horizontal position and the discharge 22 in a vertical and downwardly extending position. When oriented in this way, it will be evident that when the valve 10 yields to an excessive pressure within the passage 2, fluid and suspended solid matter passing into the chamber 6 are readily discharged by gravity through the passage 23, thus preventing accumulation of solid particles in the chamber 6 and facilitating reseating of the valve 10 when pressure in the passage 2 is reduced.

It will, of course, be understood that my improved valve unit can be made of any suitable material of any suitable size to meet the needs of particular intended uses of the valve. It is also within the scope of my invention to employ, in place of the yieldable valve support, other pressure responsive means which may provide for a positive opening and closing of the valve in response to pressure changes within the passage 2.

The essential features which must be maintained in adapting my valve to particular uses include the inwardly tapered wall portions 3 of the passage 2 and the seating of the valve 10 so that the face 11 thereof is substantially flush with the walls of the passage 2. The tapered walls provide a restricted cross sectional contour in the passage 2 adjacent the valve, thus causing an accelerated flow of fluid past the valve and further reducing the chance of solid matter accumulating to interfere with functioning of the valve.

It should also be noted that the valve aperture 7 should be sufficiently large to permit discharge therethrough of the full volume of fluid normally being transported so that the valve unit will fully safeguard equipment in the event of a complete stoppage in the pipe, conduit or other fluid feed line in which the valve unit is mounted.

Modifications in the various coupling or mounting means and in the valve supporting and actuating means will occur to those skilled in the art in adapting the valve to particular uses, and to the extent that such modifications are embraced by the appended claims, it is to be understood that they constitute part of my invention.

I claim:

1. A safety valve unit of the class described for mounting in a fluid feed line, said unit having a relatively thin walled and essentially tubular body forming a fluid passage therethrough adapted to form an integral part of said feed line, one side wall of said passage being cut out to form a valve aperture centrally thereof and walls of said passage adjacent said aperture being tapered inwardly so that the peripheral edges of said valve aperture fall in a common plane, means on said valve unit for supporting a pressure responsive valve in engagement with said valve aperture, and the outer periphery of said valve aperture and said valve being fashioned to permit seating of the valve so that the face thereof is substantially flush with inner surfaces of said fluid passage.

2. A safety valve unit of the class described for mounting in a fluid feed line, said unit having a relatively thin walled and essentially tubular body forming a fluid passage therethrough adapted to form an integral part of said feed line, one side wall of said passage being cut out to form a valve aperture centrally thereof and walls of said passage adjacent said aperture being tapered inwardly so that the peripheral edges of said valve aperture fall in a common plane, means on said valve unit for supporting a pressure responsive valve in engagement with said valve aperture, the outer periphery of said valve aperture and said valve being fashioned to permit seating of the valve so that the face thereof is substantially flush with inner surfaces of said fluid passage, and said valve aperture being sufficiently large to permit complete discharge of the normal flow of fluid in said passage.

3. A safety valve unit of the class described for mounting in a fluid feed line, said unit having a relatively thin walled and essentially tubular body forming a fluid passage therethrough adapted to form an integral part of said feed line, one side wall of said passage being cut out to form a valve aperture centrally thereof and walls of said passage adjacent said aperture being tapered inwardly so that the peripheral edges of said valve aperture fall in a common plane, means on said valve unit for supporting a pressure responsive valve in engagement with said valve aperture, the outer periphery of said valve aperture and said valve being fashioned to permit seating of the valve so that the face thereof is substantially flush with inner surfaces of said fluid passage, and said valve unit being further provided with means forming a valve chamber surrounding said valve aperture and said last named means including a discharge passage registering with said valve chamber.

4. In a safety valve unit having a fluid passage therethrough adapted to form an integral part of a fluid feed line, a valve chamber separated from said fluid passage by a thin walled portion and registering with said passage through a valve aperture in said thin walled portion and a fluid discharge registering with said valve chamber, means including inwardly tapered walls of said passage adjacent said aperture for disposing peripheral edges of said aperture in a common plane, and a valve yieldably supported in said valve chamber in engagement with said valve aperture, said valve and aperture being fashioned to provide seating of the valve with the face thereof substantially flush with the inwardly tapered walls of said passage.

5. A safety valve of the class described comprising a unitary body having tubular means forming a fluid passage therethrough, an offset portion centrally of said tubular means forming a valve chamber, said valve chamber being separated from said fluid passage by a thin walled portion and registering with said passage through a valve aperture in said thin walled portion, and a tubular discharge registering with said valve chamber, means yieldably supporting a valve within said chamber for seating engagement with said valve aperture, and walls of said fluid passage being tapered inwardly adjacent said valve aperture to dispose the periphery of said aperture in a common plane and to provide for seating of said valve with the face thereof substantially flush with inner surfaces of said passage.

6. A safety valve as described in claim 5 wherein the valve is supported in said chamber by means of an elongated valve stem protruding through an opening in said chamber opposed to said valve aperture, a flexible diaphragm secured to said valve stem and overlying said opening, and a valve supporting unit detachably coupled with the offset portion of said unitary body and in peripheral engagement with said diaphragm, said valve supporting unit including resilient means in engagement with said valve stem for urging the valve in the direction of said valve aperture, and means for adjusting the tension of said resilient means.

7. A safety valve unit of the class described for mounting in a fluid feed line, said unit having an essentially thin walled tubular body forming a fluid passage therethrough adapted to form an integral part of said feed line, the walls of said tubular body at one side thereof being tapered inwardly to provide a substantially flat walled portion centrally of said body, said flat walled portion having an enlarged opening forming a valve aperture therein, means on said valve unit for supporting a pressure responsive valve in engagement with said valve aperture, and the periphery of said valve aperture outwardly of said fluid passage and said valve being fashioned to provide seating of the valve with the face thereof substantially flush with the inner surface of the flat walled portion of said fluid passage.

VERNE H. SCHNEBEL.

REFERENCES CITED

The following references are of record in the file of this patent:

UNITED STATES PATENTS

| Number | Name | Date |
| --- | --- | --- |
| 182,815 | Foster | Oct. 3, 1876 |
| 590,195 | Waybright | Sept. 14, 1897 |
| 1,360,160 | Weaver | Nov. 23, 1920 |
| 1,961,758 | Glab | June 5, 1934 |
| 2,269,404 | Haven | Jan. 6, 1942 |
| 2,440,608 | Hunter | Apr. 27, 1948 |

FOREIGN PATENTS

| Number | Country | Date |
| --- | --- | --- |
| 527,917 | Great Britain | Oct. 18, 1940 |
| 614,351 | Germany | June 6, 1932 |